(12) United States Patent
Zimmer et al.

(10) Patent No.: US 9,373,184 B2
(45) Date of Patent: Jun. 21, 2016

(54) AUTOMATIC WINDOW PLACEMENT

(71) Applicant: The Boeing Company, Chicago, IL (US)

(72) Inventors: Nico Zimmer, Neu-Isenburg (DE); Brian A. Azcuenaga, Castle Rock, CO (US); Krzysztof Pytel, Gdansk (PL); Bo Vaaben, Espergaerde (DK)

(73) Assignee: The Boeing Company, Chicago, IL (US)

( * ) Notice: Subject to any disclaimer, the term of this patent is extended or adjusted under 35 U.S.C. 154(b) by 262 days.

(21) Appl. No.: 14/195,580

(22) Filed: Mar. 3, 2014

(65) Prior Publication Data
US 2015/0248781 A1 Sep. 3, 2015

(51) Int. Cl.
G06T 11/60 (2006.01)
G06T 7/40 (2006.01)
G09G 5/14 (2006.01)
G09G 5/38 (2006.01)
G08G 5/00 (2006.01)

(52) U.S. Cl.
CPC .......... *G06T 11/60* (2013.01); *G06T 7/408* (2013.01); *G09G 5/14* (2013.01); *G06T 2200/24* (2013.01); *G08G 5/0026* (2013.01); *G09G 5/38* (2013.01); *G09G 2380/12* (2013.01)

(58) Field of Classification Search
None
See application file for complete search history.

(56) References Cited

U.S. PATENT DOCUMENTS

| 2008/0059571 | A1* | 3/2008 | Khoo | G06Q 30/02 709/203 |
| 2008/0306691 | A1* | 12/2008 | Louis | G08G 5/06 701/301 |
| 2009/0164293 | A1 | 6/2009 | Coley | |
| 2010/0141648 | A1 | 6/2010 | Bell et al. | |
| 2014/0325345 | A1* | 10/2014 | Vano | G06F 17/211 715/236 |

FOREIGN PATENT DOCUMENTS

| EP | 0978003 B1 * | 4/1998 |
| EP | 0978003 A1 | 2/2000 |
| WO | WO 98/49579 A1 | 11/1998 |

OTHER PUBLICATIONS

European Patent Application No. 15156702.1; Extended European Search Report; dated May 4, 2015; 12 pages.

* cited by examiner

*Primary Examiner* — Mark Zimmerman
*Assistant Examiner* — Vu Nguyen
(74) *Attorney, Agent, or Firm* — Baker & Hostetler LLP

(57) ABSTRACT

A method for rendering data on a display device is described. Data representative of graphics objects rendered on the display device is received. The data is analyzed to identify white space areas. The white space areas are compared to a display area to be rendered on the display device. The white space areas are areas that are substantially free of displayed objects according to a criterion. Based on the comparison, one or more of the white space areas are identified for rendering the display area. The display area is automatically rendered in the identified white space areas on the display device without user intervention. When the white space areas are insufficient to render the display area, the display area may be automatically rendered based on one or more criteria.

17 Claims, 4 Drawing Sheets

AUTOMATIC WINDOW PLACEMENT

BACKGROUND

Transportation crew and staff typically use management information tools to perform various tasks and operations. For example, for an air traffic scenario, an airport controller may use the Advanced Surface Movement and Guidance Control System (A-SMGCS). The A-SMGCS may provide a user display that includes an airport layout with airport traffic information. The A-SMGCS may provide multiple information sources during various operational scenarios. Other transportation operations, such as passenger train and cruise ship operations, also use other types of management information tools.

SUMMARY

Illustrative examples of the present disclosure include, without limitation, a method, computing device, and computer-readable storage medium. In one aspect, a method for rendering data on a display device is described. Data representative of graphics objects rendered on the display device is received. The data is analyzed to identify white space areas. The white space areas are compared to a display area to be rendered on the display device. The white space areas are areas that are substantially free of displayed objects according to a criterion. Based on the comparison, one or more of the white space areas are identified for rendering the display area. The display area is automatically rendered in the identified white space areas on the display device without user intervention. When the white space areas are insufficient to render the display area, the display area may be automatically rendered based on one or more criteria.

In another aspect, a computing device configured to cause rendering of data on a display device is provided. The device may include a processor and memory. Areas on the display device where graphics objects are rendered are determined. White space areas based on the determined areas are identified, and one or more of the white space areas are determined for rendering an additional graphics object. The additional graphics object is automatically rendered in the determined white space area on the display device without user intervention. When the white space areas are insufficient to render the additional graphics object, the additional graphics object may be automatically rendered based on one or more criteria.

In another aspect, a computer-readable storage medium is provided. A user screen rendered on a display device is analyzed to identify white space areas. One or more of the white space areas are determined for rendering a graphics object. The graphics object is automatically rendered in the determined white space areas. When the white space areas are insufficient to render the graphics object, the graphics object may be automatically rendered based on one or more criteria.

The features, functions, and advantages that have been discussed can be achieved independently in various embodiments or may be combined in yet other embodiments, further details of which can be seen with reference to the following description and drawings.

BRIEF DESCRIPTION OF DRAWINGS

Examples of techniques in accordance with the present disclosure are described in detail below with reference to the following illustrations.

DETAILED DESCRIPTION

The A-SMGCS may provide and render multiple information sources during various operational scenarios, such as an airport layout with own ship positions of aircraft. In some cases, important and timely information may be provided on the screen, for example by using pop-up windows to provide alerts. If a pop-up window is rendered over an area that the controller is viewing, then the controller may have to move the pop-up windows manually to unused areas or other white space areas of the display so as not to impede viewing of important information. The placement of pop-up windows and other user display artifacts on the display may lead to problems that may impact operational efficiency and effectiveness, especially during time critical operations such as aircraft taxiing operations or runway incursions. Problems encountered in these scenarios may include delays in identifying potential problems and missed communications, to name a few. Although such pop-up windows can be manually placed in unused screen areas, such pop-up windows may continue to be generated during certain scenarios, causing continued interruptions to the controller's operations.

The present disclosure describes methods and systems for the automatic placement of pop-up windows to whitespace areas on a map/screen while minimizing or avoiding overlap with important areas of the map/screen, thus avoiding the need to manually move the windows from an initial placement on the map/screen to a white space area. In various implementations, an algorithm may be provided for automatically detecting the whitespace area based on the display contents (e.g., airport map) for placement of windows and other display artifacts.

The various examples used in this disclosure are described in the context of a commercial airline flight operation, but it should be understood that the described principles may be applied to any scenario where automatic placement of display artifacts may be provided. Such examples in the field of transportation include airline, train, and cruise ship operations. Other examples include scenarios such as computer games and other computer applications, mobile phone notifications, head-up display, or augmented reality devices. In general, the described principles are applicable to any display where it is desirable to avoid overlaying objects of higher importance with notifications of lower importance.

The Advanced Surface Movement Guidance & Control System (A-SMGCS) is a system providing routing, guidance, and surveillance for the control of aircraft and vehicles to maintain a declared surface movement rate. The A-SMGCS is used to safely and efficiently manage the aircraft and vehicles in an aerodrome (a location from which aircraft flight operations take place) with respect to traffic density and aerodrome layout, taking into account the demanded capacity under various visibility conditions.

Figure 1:
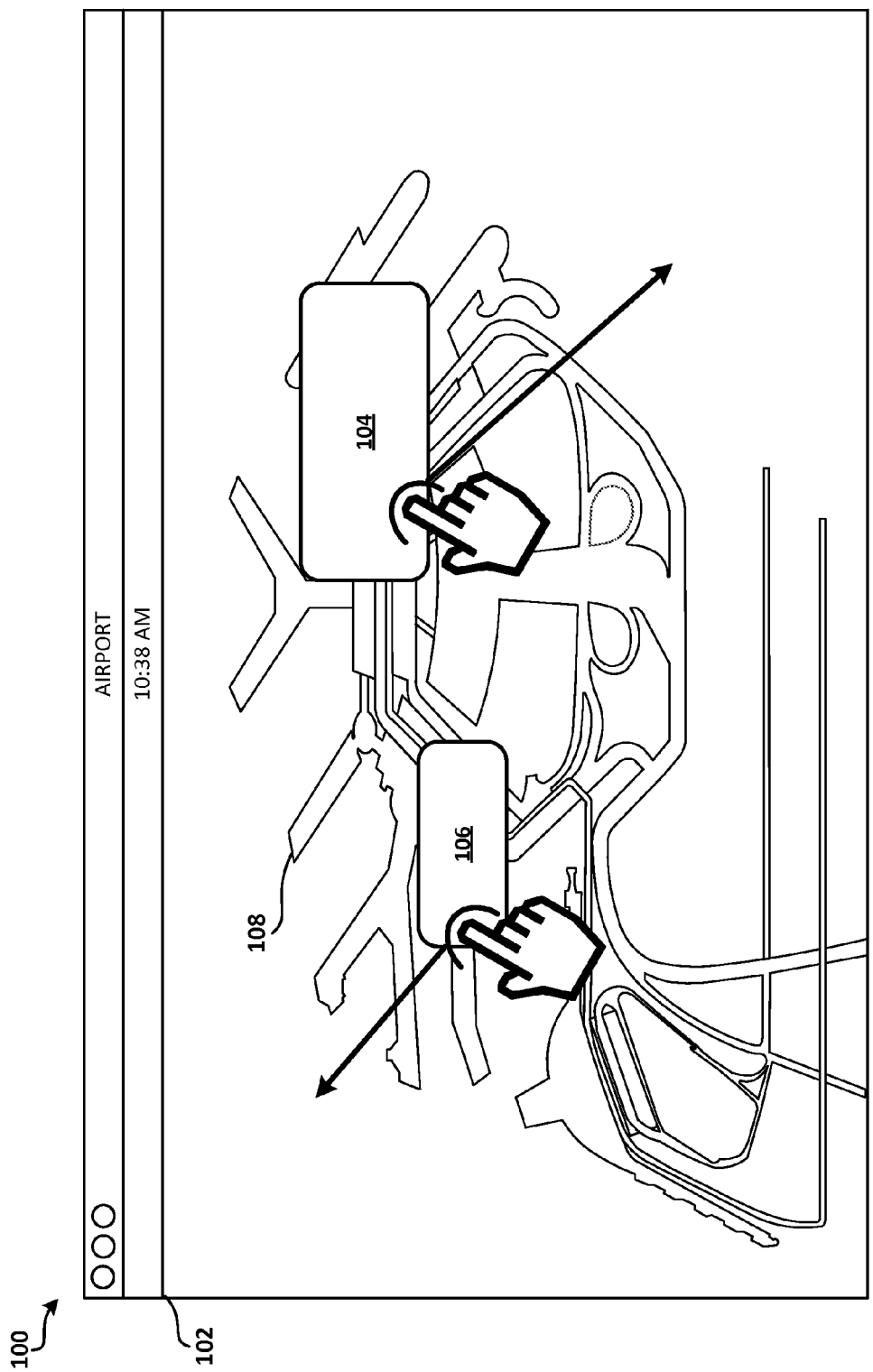
FIG. 1 depicts a user interface that may be used in conjunction with this disclosure.

A user of the A-SMGCS can be provided a user interface such as the one shown in FIG. 1. FIG. 1 depicts a user interface 100 to a user in a window 102 of a browser or other client application executing on a computer system. FIG. 1 illustrates the manual placement of windows 104 and 106 from the airport map area 108 to white space areas by manual interaction.

Figure 2:
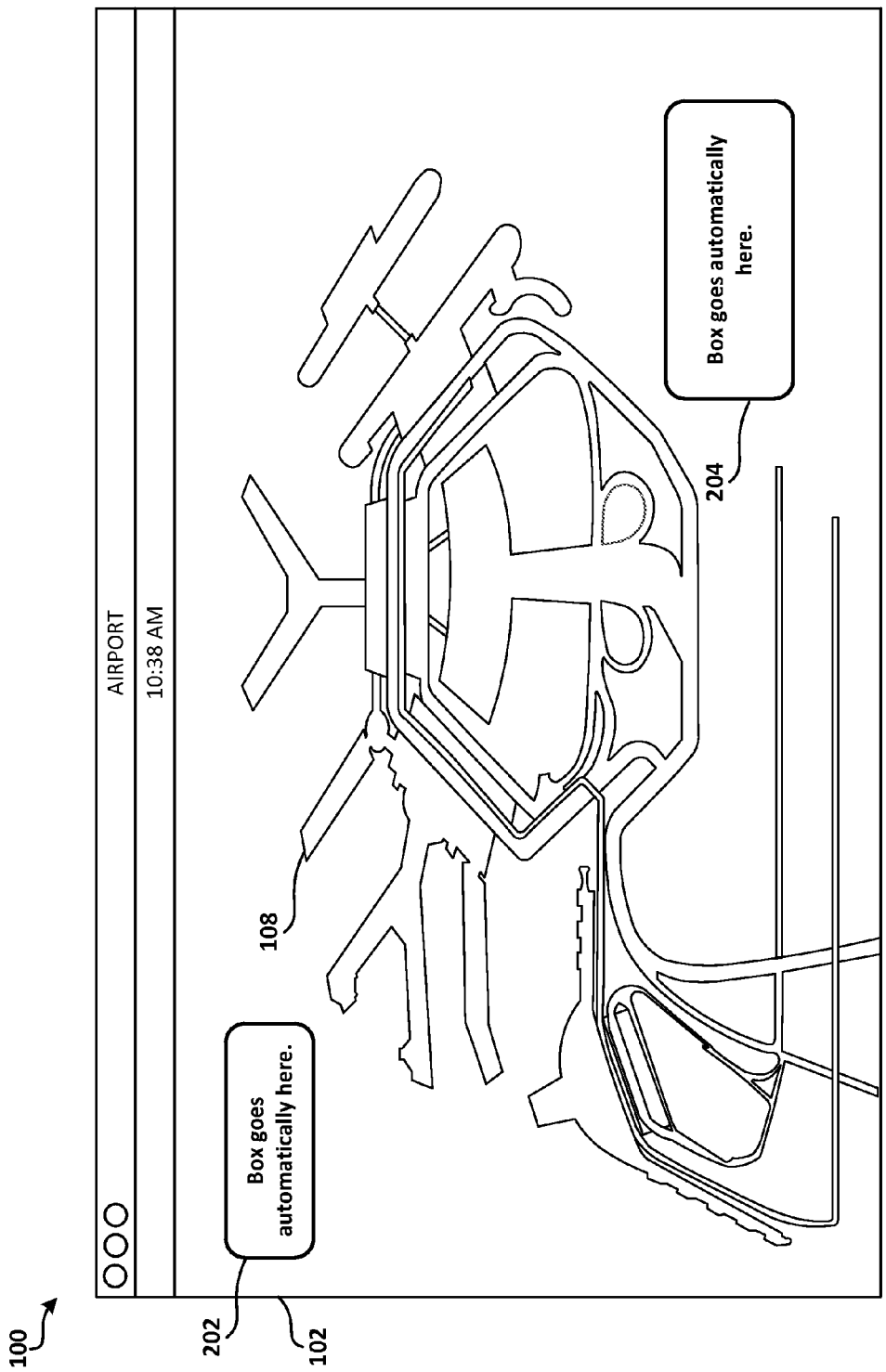
FIG. 2 depicts a user interface that may be used in conjunction with this disclosure.

FIG. 2 illustrates automatic window placement in accordance with the present disclosure. As shown in FIG. 2, pop-up windows 202 and 204 are automatically placed in the white space areas of window 102 and not directly over active areas of the airport map area 108.

Figure 3:
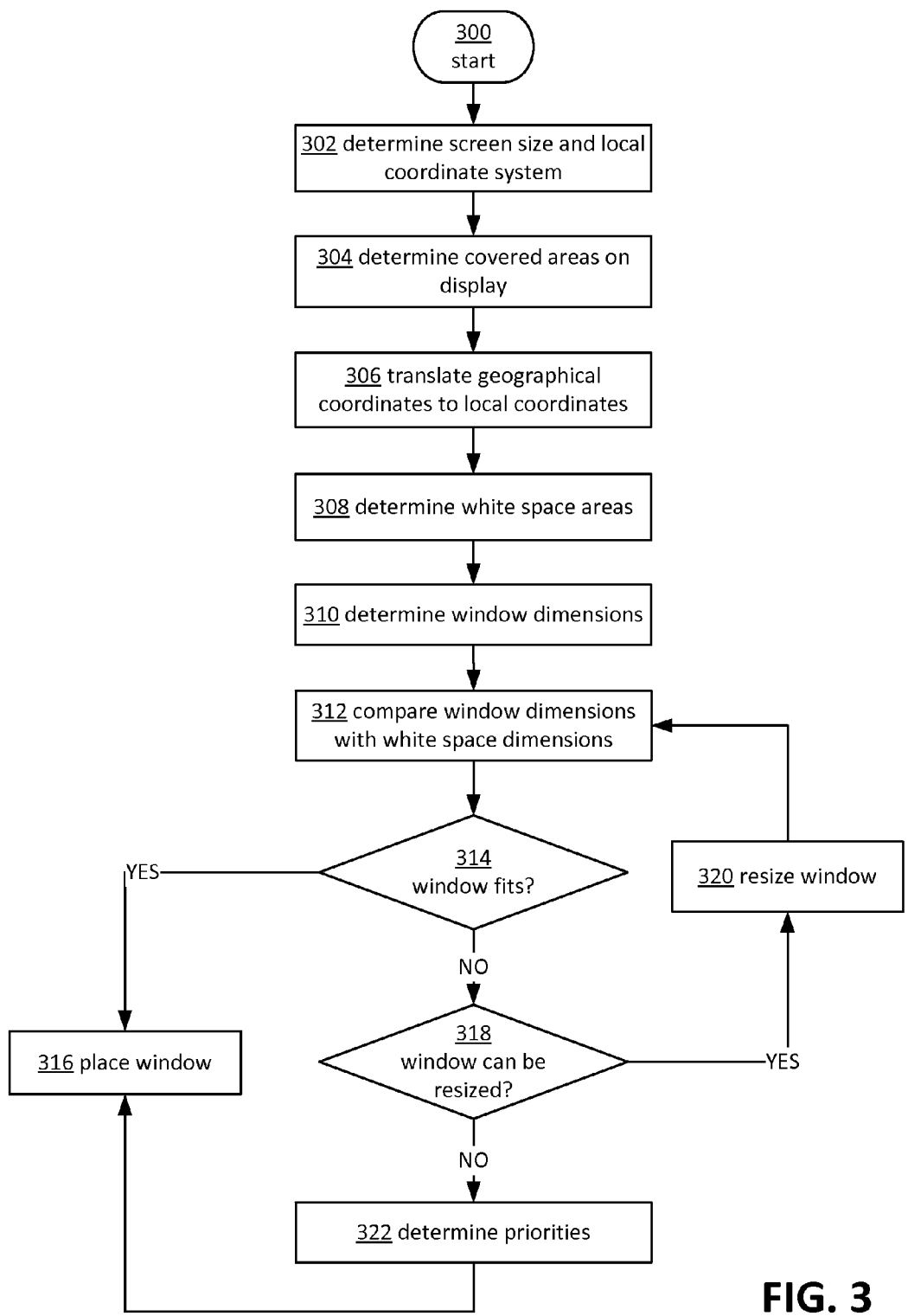
FIG. 3 depicts an example procedure for providing shared collaboration and communication space in accordance with this disclosure.

In at least some implementations of this disclosure, an algorithm may be provided to determine pop-window placement on a display. FIG. 3 depicts an example operational procedure for automatic window placement including operations 300, 302, 304, 306, 308, 310, 312, 314, 316, and 318. The illustrated operations are provided as examples and do not imply a particular order, and such an algorithm may include one or more of the described operations.

Referring to FIG. 3, operation 300 begins the operational procedure and operation 302 illustrates determining the screen size and the local coordinate system. The current size of the user display may be obtained from the operating system, the graphics rendering system, an application programming interface (API), or other sources. Additionally, the local coordinate system that is associated with currently displayed information may be obtained from the same source or different sources.

Operation 302 may be followed by operation 304. Operation 304 illustrates determining covered areas (or rendered areas) on the user screen by determining locations of known objects. A database or listing of rendered objects may be used to determine objects that are currently rendered on the user screens. In some implementations, a geographic information system (GIS) database may be used to identify rendered objects. More generally, any system that provides spatial and visualization data may be used. For example, polygon objects (e.g., runways, taxiways, aprons, etc.) from the Airport Mapping Database (AMDB) may be matched to geographic coordinates to determine geographic placement of rendered objects. The AMDB may include objects described as points, lines, and polygons to represent a view such as the spatial layout of an airport and the geometry of features such as runways, taxiways, and buildings.

Operation 304 may be followed by operation 306. Operation 306 illustrates translating geographical coordinates to local coordinates. The position of the known objects may be expressed in the local coordinate system using, for example, a matrix transformation.

Operation 306 may be followed by operation 308. Operation 308 illustrates using spatial operations or analysis such as surface subtraction to determine the white space areas. A spatial operation may be any function that takes inputs based on a first model or coordinate system and analyzes and assimilates the inputs to perform some transformation or other operation to a second model or coordinate system. White space on a display may be any portion of a display or screen that is left unrendered or unmarked. An area of white space on a screen may not be completely unmarked but can be substantially free from visual artifacts according to one or more criteria such as the maximum number of marked pixels per predefined area.

Operation 308 may be followed by operation 310. Operation 310 illustrates determining the window dimensions based on the content for rendering on the display. The dimensions of the content such as a pop-up window may be indicated by size (such as 3.5 inches by 2.5 inches), pixels (such as 100×125 pixels), or any other units for identifying the size for the object to be rendered.

Operation 310 may be followed by operation 312. Operation 312 illustrates comparing window dimensions with white space dimensions. The dimensions of the window that is to be rendered may be compared to the dimensions of the white space areas. Operation 312 may be followed by operation 314. Operation 314 illustrates determining if the window fits within the white space dimensions.

If the window fits within the white space dimensions, then operation 314 may be followed by operation 316. Operation 316 illustrates placing the window where the dimensions fit. The windows may be placed where white space areas have been identified as being of sufficient size to accommodate the window. In some cases the window may exceed the size of an identified white space within a predetermined tolerance. For example, it may be acceptable to obscure an outside edge of a rendered display object without interfering with the operator's view of the overall displayed information.

If no windows fit any of the white space dimensions, then operation 314 may be followed by operation 318. Operation 318 illustrates determining if the window size can be reduced or resized to fit the white space dimensions. In many cases, a resizing of the window may allow the window to fit into an identified white space area. Further analysis may be performed to determine if any restrictions are in place that bound the amount of resizing that can be allowed. For example, a minimum font size for text inside the pop-up window may restrict how much the size of the pop-up window can be reduced.

If the window size can be reduced or resized to fit the white space dimensions, then operation 318 may be followed by operation 320, which illustrates resizing the window. Operation 320 may then be followed by operation 312 to compare the resized window with the white space dimensions.

If the window size cannot be reduced or resized to fit the white space dimensions, then operation 318 may be followed by operation 322, which illustrates determining priorities for the covered or rendered areas. Determining priorities may include accessing data that indicates the relative importance between the currently rendered areas on the display. Some rendered areas may be of high importance and may be marked as an area that cannot be obscured with a pop-up window. Other areas may allow pop-up windows, but such areas may be ordered by priority based on the relative importance of the areas. This information may be included with metadata associated with each area, or may be defined in an accessible file, or any other means for providing priority information. Operation 322 may then be followed by operation 316 which illustrates placing the window over an area where a pop-up window is allowed.

The windows may be rendered automatically on the user display. For example, the pop-up windows may be placed in the identified white space areas without further interaction or input from the user, thus avoiding the need for the user to move the windows or otherwise be interrupted for current user tasks. Because of the automatic placement, the controller or user need not respond to alerts and actions that may be deemed to be unimportant at the current time and move windows and other visual artifacts on the display.

It should be noted that other methods for identifying white space areas may be used. For example, image data for the currently rendered user frame may be analyzed to determine user interface elements and borders between image data and text data. In some implementations, the current frame may be divided into areas to separate image and text content. In one example, it can be assumed that the text areas should not be covered by a pop-up window, and the image areas can then be analyzed to identify white space areas. The image areas can be analyzed to identify edges and an edge map can be generated. The edge map may be analyzed to identify displayed elements and white space areas. In one implementation, the edge map may be divided into rectangular white space areas of various sizes using the horizontal and vertical edges of the edge map. The sizes of the various white space rectangles can be compared to pop-up windows that are to be rendered to identify appropriate areas for the windows. By using the above described procedure, a grid of possible window locations may be determined that is aligned to the current display while avoiding obscuring areas that are being used for providing user information.

Figure 4:
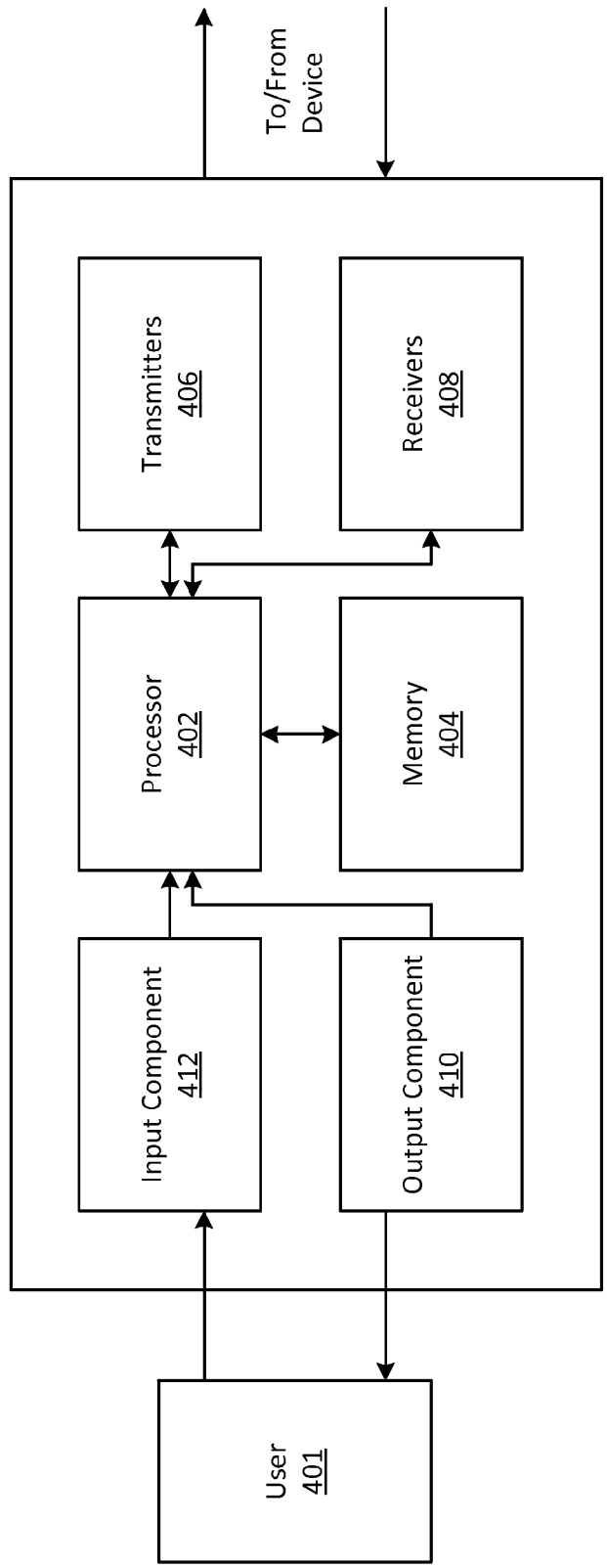
FIG. 4 is an example schematic diagram of a computing device that may be used in conjunction with this disclosure.

FIG. 4 is an example schematic diagram of a user device that may be used in conjunction with a shared collaboration and communication space. In one example, a user device may include a processor 402, a memory device 404 coupled to processor 402, one or more wireless transmitters 406, one or more wireless receivers 408, an output component 410, and an input component 412.

Processor 402 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above example examples are not intended to limit in any way the definition and/or meaning of the term "processor."

Memory device 404 includes a non-transitory computer-readable storage medium, such as, without limitation, random access memory (RAM), flash memory, a hard disk drive, a solid state drive, a diskette, a Flash drive, a compact disc, a digital video disc, and/or any suitable memory. In the exemplary implementation, memory device 404 includes data and/or instructions embodying aspects of the disclosure that are executable by processor 402 (e.g., processor 402 may be programmed by the instructions) to enable processor 402 to perform the functions described herein. Additionally, the memory device 404 may comprise an operation system and applications.

Wireless transmitters 406 are configured to transmit control signals and data signals over a network. In one example, wireless transmitters 406 may transmit in a radio frequency spectrum and operate using an appropriate communication protocol.

Wireless receivers 408 are configured to receive control signals and data signals over network. In one example, wireless receivers 408 may receive signals on a radio frequency spectrum using an appropriate communication pro.

The node may also include at least one output component 410 for presenting information to a user 401. Output component 410 may be any component capable of conveying information to user 401. In some implementations, output component 410 includes an output adapter, such as a video adapter and/or an audio adapter or the like. An output adapter is operatively coupled to processor 402 and is configured to be operatively coupled to an output device, such as a display device (e.g., a liquid crystal display (LCD), organic light emitting diode (OLED) display, cathode ray tube (CRT), "electronic ink" display, or the like) or an audio output device (e.g., a speaker, headphones, or the like). In some implementations, at least one such display device and/or audio device is included with output component 410.

The node may also include at least one input component 412 for receiving input from user 401. Input component 412 may include, for example, a keyboard, a pointing device, a mouse, a stylus, a touch sensitive panel (e.g., a touch pad or a touch screen), a gyroscope, an accelerometer, a position detector, an audio input device, or the like. A single component, such as a touch screen, may function as both an output device of output component 410 and input component 412. In some implementations, output component 410 and/or input component 412 include an adapter for communicating data and/or instructions between the node and a computer connected thereto.

As discussed above, at least a part of the communications in the shared collaboration and communication space may be recorded for later retrieval and consumption or analysis. In some examples, the communications may be recorded and stored on the user device. In other examples, the communications may be stored on a server. For example, the shared collaboration and communication space may be implemented and facilitated by a service running remotely.

It will be appreciated that, while various items are illustrated as being stored in memory or on storage while being used, these items or portions of them may be transferred between memory and other storage devices. Alternatively, in other embodiments some or all of the software modules and/or systems may execute in memory on another device and communicate with the illustrated computing systems via inter-computer communication. In some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

In some embodiments, a system memory may be used, which is one embodiment of a computer-readable storage medium configured to store program instructions and data as described above for FIGS. 1-4 for implementing embodiments of the corresponding methods and apparatus. However, in other embodiments, program instructions and/or data may be received, sent, or stored upon different types of computer-accessible media. Generally speaking, a computer-readable storage medium may include non-transitory and tangible storage media or memory media such as magnetic or optical media, e.g., disk or DVD/CD coupled to a computer system or gateway device. A computer-readable storage medium may also include any volatile or non-volatile media, such as RAM (e.g., SDRAM, DDR SDRAM, RDRAM, SRAM, etc.), ROM, etc., that may be included in some embodiments of the computer systems described above as system memory, gateway device, or another type of memory. Portions or all of the multiple computer systems, such as those illustrated herein, may be used to implement the described functionality in various embodiments; for example, software components running on a variety of different devices and servers may collaborate to provide the functionality.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different ways in other embodiments, such as by having a single data structure split into multiple data structures or by having multiple data structures consolidated into a single data structure, and may store more or less information than is described (e.g., when other illustrated data structures instead lack or include such information respectively or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from, or rearranged compared to the disclosed example examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed:

1. A method of rendering data on a display device, wherein the data represents a display area to be rendered, the method comprising:
   receiving data representative of graphics objects rendered on the display device;
   analyzing the data to identify white space areas;
   comparing the white space areas to the display area to be rendered on the display device, wherein the white space areas are areas free of displayed objects according to at least one criterion;
   determining whether the display area to be rendered fits within a white space area;
   determining whether the display area to be rendered can be reduced in size to fit within a white space area;
   determining priorities for the rendered graphics objects, wherein determining priorities includes accessing data indicating (1) whether each rendered graphics object can be obscured, and (2) the relative importance of the rendered graphics objects; and
   if the display area to be rendered does not fit within a white space area and cannot be reduced in size to fit within a white space area, rendering the display area over a selected one of the rendered graphics objects, wherein the selected one of the rendered graphics objects is based on the priorities.

2. The method of claim 1, wherein the graphics objects form part of an airport layout.

3. The method of claim 2, wherein the at least one display area comprises a pop-up window.

4. The method of claim 1, wherein the graphics objects comprise objects from a geographic information system.

5. The method of claim 4, wherein the geographic information system is an Airport Mapping Database.

6. The method of claim 1, wherein the analyzing comprises determining a screen size.

7. The method of claim 1, wherein the analyzing comprises determining a local coordinate system.

8. The method of claim 7, wherein the analyzing comprises translating geographical coordinates to local coordinates.

9. The method of claim 8, wherein the analyzing comprises using spatial operations to determine the white space areas.

10. The method of claim 1, further comprising determining dimensions of the display area.

11. The method of claim 1, wherein at least some of the data is received from an operating system.

12. The method of claim 1, wherein at least some of the data is received via an application programming interface (API).

13. The method of claim 1, wherein the at least one criterion comprises a maximum number of pixels within a predefined area.

14. A computing device configured to cause rendering of data on a display device, the computing device comprising at least a processor and memory, the memory having stored thereon computer executable instructions that, when executed by the at least one processor, cause the computing device to at least:
   analyze data representative of graphics objects rendered on the display device to identify white space areas, wherein the white space areas are areas free of displayed objects according to at least one criterion;
   determine whether a display area to be rendered fits within a white space area or can be reduced in size to fit within a white space area;

determine priorities for the rendered graphics objects by accessing data indicating (1) whether each rendered graphics object can be obscured, and (2) the relative importance of the rendered graphics objects; and if the display area to be rendered does not fit within a white space area and cannot be reduced in size to fit within a white space area, rendering the display area over a selected one of the rendered graphics objects, wherein the selected one of the rendered graphics objects is based on the priorities.

15. A non-transitory computer-readable storage medium having computer-readable instructions stored thereon, the computer-readable instructions comprising instructions that upon execution on a computing system, at least cause:

analyze data representative of graphics objects rendered on the display device to identify white space areas, wherein the white space areas are areas free of displayed objects according to at least one criterion;

determine whether a display area to be rendered fits within a white space area or can be reduced in size to fit within a white space area;

determine priorities for the rendered graphics objects by accessing data indicating (1) whether each rendered graphics object can be obscured, and (2) the relative importance of the rendered graphics objects; and if the display area to be rendered does not fit within a white space area and cannot be reduced in size to fit within a white space area, rendering the display area over a selected one of the rendered graphics objects, wherein the selected one of the rendered graphics objects is based on the priorities.

16. The non-transitory computer-readable medium of claim 15, further comprising instructions for using a geographic information system to identify rendered graphics objects.

17. The non-transitory computer-readable medium of claim 15, further comprising instructions for comparing the white space areas to the display area to be rendered.

* * * * *